UNITED STATES PATENT OFFICE.

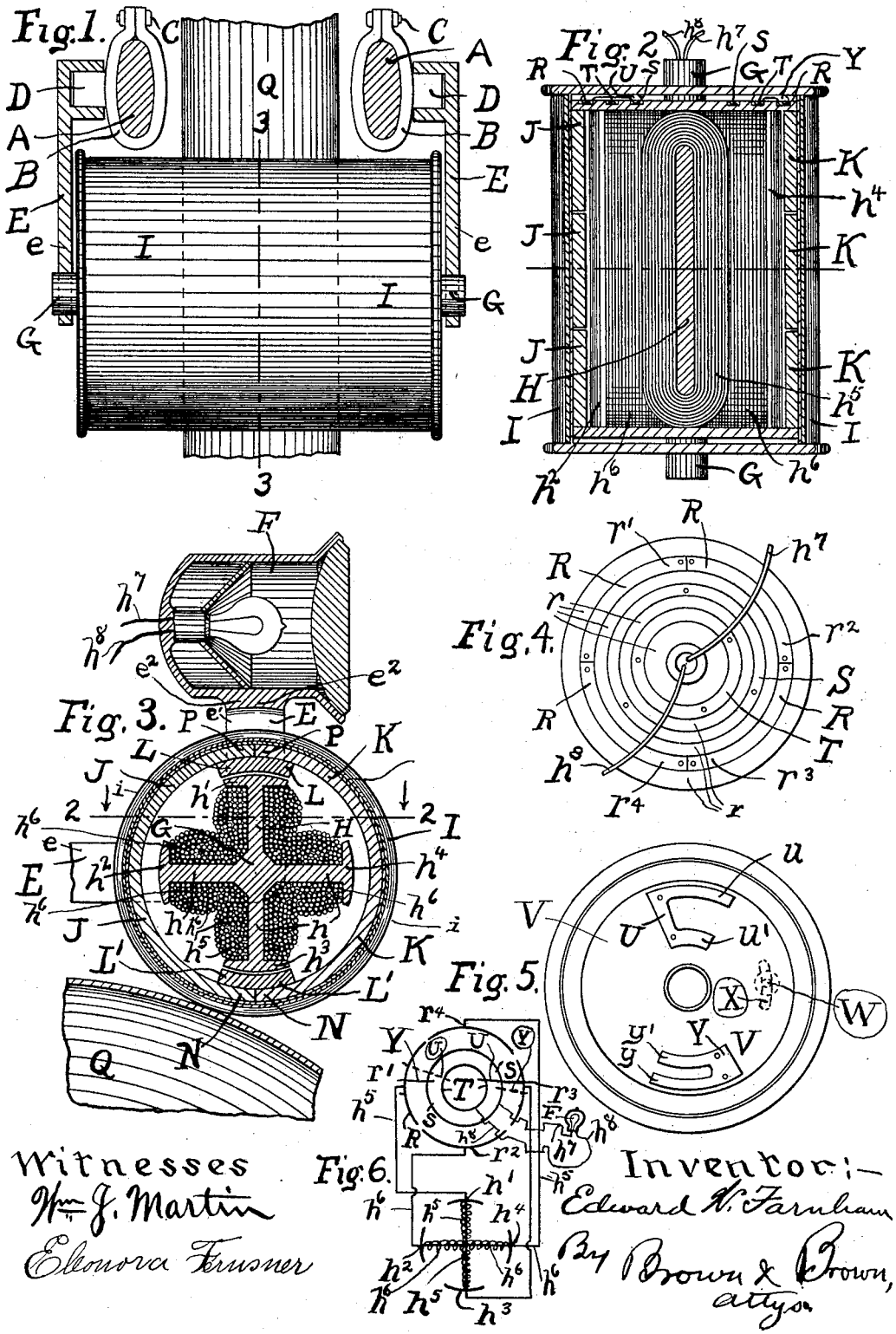

EDWARD WILSON FARNHAM, OF CHICAGO, ILLINOIS.

DYNAMO-ELECTRIC MACHINE.

SPECIFICATION forming part of Letters Patent No. 591,623, dated October 12, 1897.

Application filed June 14, 1897. Serial No. 640,597. (No model.)

*To all whom it may concern:*

Be it known that I, EDWARD WILSON FARNHAM, a resident of Chicago, in the county of Cook and State of Illinois, have invented certain new and useful Improvements in Dynamos, of which the following, when taken in connection with the drawings accompanying and forming a part hereof, is a full and complete description, sufficient to enable those skilled in the art to which it pertains to understand and make the same.

This invention has for its purposes the production of a dynamo suitable to be placed on a bicycle and actuated by the rotation of the wheels of the bicycle; to generate a current of electricity to be used in an electric lamp for lighting purpose; to produce a dynamo which can be used in other vehicles than a bicycle, if desired, and the current generated thereby utilized for the production of a light from an electric lamp, or to ring an electric alarm-bell conveniently placed upon such bicycle or other vehicle, and to produce a dynamo which will not become clogged by dust, dirt, or other material likely to be brought into contact therewith when used for the purposes stated.

To those skilled in the art it is evident that in the running of a bicycle or other vehicle over the ordinary dirt, macadamized, or paved roads and streets in and adjacent to large cities much dust is encountered and the movable parts, particularly bearings of rotatory mechanism attached to or forming a part of the dynamo, will, in the passing of the vehicle over such roads and streets, unless well protected therefrom, be liable to wear or be ground out by the material encountered, as aforesaid, and driven or otherwise forced thereinto.

The dynamo embodying this invention is, as hereinbefore stated, actuated by the revolving wheels of the vehicle to which it is attached, and where it is placed upon a bicycle or other vehicle having rubber tires the rotation thereof may be and preferably is obtained by frictional contact with such tire of the rotatory parts of the dynamo, but gears may be used attached to some one of the wheels of a vehicle and gearing intermeshing therewith and engaging with the rotatory parts of the dynamo.

Briefly stated, the dynamo embodying my invention comprises a non-rotatable armature and rotatable fields, preferably permanent magnets, such rotatable fields being attached to the inner surface of a rotatably-mounted cylinder closed at its ends, so that dust or other material will not readily penetrate thereinto, and connected, to be driven thereby, to one of the wheels of the vehicle to which the dynamo is attached.

In the drawings embodying this invention Figure 1 is a horizontal sectional view of the front fork of a bicycle, showing the brackets attached thereto by which the dynamo can be secured on a bicycle, and also a top plan view of the rotatory cylindrical casing of the dynamo embodying the invention, and a short section of the tire of a front bicycle-wheel in frictional contact with such rotatable cylinder and by which it is actuated. Fig. 2 is a horizontal sectional view of the dynamo embodying this invention on line 2 2 of Fig. 3, viewed in the direction indicated by the arrows. Fig. 3 is a vertical sectional view on line 3 3 of Fig. 1, viewed from the left-hand side, looking toward the right, of such Fig. 1, showing a sectional view of a small portion of the tire of the front wheel of the bicycle in frictional contact with the rotatory cylindrical casing of the dynamo. Fig. 4 is an end elevation of the stationary armature, showing the commutator-ring and the collector-rings on the end thereof. Fig. 5 is an end elevation of the inner face of one of the ends of the field-magnet casing, showing the brushes coming in contact with the commutator and the collector rings illustrated in Fig. 4; and Fig. 6 is a diagram illustrating the position of the commutator and collector rings, the winding of the non-rotatable armature, and the wires from such armature to the commutator-ring.

A reference-letter applied to designate a given part is used to indicate such part throughout the several figures of the drawings.

A A are the arms of the front fork of a bicycle.

B B are the clamps, secured to the arms A A by bolts C C, respectively.

D D are posts on clamps B B.

$e\ e$ are the horizontal arms of dynamo-frame E, and $e'\ e'$ are the vertical arms of such frame.

$e^2$ is a table of frame E, forming the support of the lamp F. This lamp F forms no part of my invention, it being simply necessary that such lamp correspond in resistance with the current generated by the dynamo, and it is therefore not illustrated in detail.

G is the shaft of the dynamo and is non-rotatably mounted in the frame E.

H is the armature of the dynamo, rigidly mounted on shaft G. The armature H comprises radial arms $h$ $h$ $h$ $h$ and bars $h'$ $h^2$ $h^3$ $h^4$ of soft iron, bars $h'$ $h^3$, wound with insulated wire $h^5$, and bars $h^2$ $h^4$, wound with insulated wire $h^6$, respectively.

I is the casing, rotatably mounted on non-rotatable shaft G.

J K are permanent magnets secured in casing I to rotate therewith and so arranged that the positive poles thereof (marked P P) shall be adjacent and the negative poles N N shall be adjacent to each other.

L L' are the field-cheeks of the permanent magnets J K, L being the positive and L' the negative. These magnets are so placed that the field-cheeks L L' rotate by the soft-iron bars $h'$ $h^2$ $h^3$ $h^4$ of armature H close to contact therewith.

$h^7$ $h^8$ are wires from the armature H to the lamp F, such wires forming the circuit from the dynamo to the lamp lighted thereby.

Q is a bicycle-tire in frictional contact with casing I, by which such casing is rotated as the bicycle is propelled by the person mounted thereon.

$i$ is a rubber band on casing I. Rubber band $i$ may or may not be used, as preferred.

R is a commutator-ring composed of sections $r'$ $r^2$ $r^3$ $r^4$.

S and T are respectively rings.

The several sections $r'$ $r^2$ $r^3$ $r^4$ of the commutator-ring are secured at one end of the non-rotatable armature H on insulated base $r$ and are in electrical contact, respectively, with the wires $h^5$ $h^6$, with which such armature is wound. Collector-rings S and T are also secured to one end of the armature H upon insulated base $r$.

U is a brush secured to the end of casing I, on the inside of such end adjacent to the commutator-ring R and collector-rings S and T, but insulated from the casing by interposing between such brush U and the end of the casing the rotatably-adjustable plate V, of indurated fiber, vulcanized rubber, or other like material. Plate V is retained in an adjusted position by set-screw W in slot X in the end of the casing. Brush U has the arms $u$ $u'$. Arm $u$ comes in electrical contact with the several sections $r'$ $r^2$ $r^3$ $r^4$ of the commutator-ring R, and the arm $u'$ comes in like electrical contact with the ring T as casing I is revolved by being in frictional contact with the tire Q of the bicycle-wheel.

Y is a brush secured to the inner surface of the end of the casing I, adjacent to the commutator-ring R and collector-rings S and T, but insulated from such casing end by the interposed plate V. Brush Y has arms $y$ $y'$, arm $y$ being in electrical contact with the several segments $r'$ $r^2$ $r^3$ $r^4$ of the commutator-ring R, and arm $y'$ in electrical contact with the collector-ring S in the revolution of the casing I.

In Fig. 6 a diagram showing the manner of winding of the armature and the connection of the wire thereof with the commutator-ring is given. In winding the armature radial arms $h$ $h$, connecting bars $h'$ $h^3$, are wound, commencing adjacent to bar $h'$, by the overturn of the wire $h^5$, as though they constituted the entire armature, and the radial arms $h$ $h$, connecting bars $h^2$ $h^4$, are wound, commencing adjacent to bar $h^2$, by an overturn of the wire $h^6$, as though they constituted the entire armature. The outer end of the wire $h^5$, adjacent to bar $h'$, is connected to segment $r'$ of the commutator R, and the inner end of such wire $h^5$, adjacent to bar $h^3$, is connected to segment $r^3$ of such commutator-ring R. The outer end of wire $h^6$, adjacent to bar $h^2$, is connected to segment $r^2$ of the commutator-ring R, and the inner end of such wire $h^6$, adjacent to bar $h^4$, is electrically connected with the segments $r^4$ of such commutator-ring. As the field is rotated by the rotation of the wheel of the vehicle to which it is attached and the positive pole L comes close to contact with the bars $h$, the negative pole L' at the same time comes close to contact with the bar $h^3$, as illustrated in Fig. 3 of the drawings. The lines of force at such time pass from the field through bar $h'$ to bar $h^3$, energizing and generating an electrical current in wound wire $h^5$, such current being conveyed to segment $r'$ by connecting-wire, then by brush Y to collector-ring S, thence through wire $h^7$ to the lamp F, through such lamp, and from thence on wire $h^8$ on collector-ring T, from thence to brush U to segments $r^3$ of the commutator-ring R, thence to the inner end of the winding $h^5$, adjacent to the bar $h^3$.

In the operation of the machine, as the field continues to rotate from the position last above described and illustrated in Fig. 6 by the diagram, and the cheek-piece L' comes close to contact with the bar $h'$, the positive cheek-piece coming at the same time close to contact with the bar $h^3$, the lines of force through the radial arms $h$, connecting such bars $h'$ $h^3$, are reversed, as are also at the same time the brushes U and Y, each of such brushes being carried to the opposite side of the armature H and so that the segments of the armature H are reversed in their contact with the collector-rings S T, thus maintaining the direct current over wires $h^7$ $h^8$ and through the lamp, although the current is reversed through the armature-winding. This reversed position of the brushes U and Y is indicated by dotted lines U Y in Fig. 6.

The manner of operation of the dynamo is: The casing I being rotated by some one of the wheels of the vehicle to which the dynamo is attached and the brushes U Y being in properly-adjusted electrical contact with the commutator-ring R and collector-rings S and T, respectively, a current of electricity will be generated by the rotation of the casing I and the permanent magnets J K and discharged from the commutator on wires $h^7$ $h^8$, passing through lamp F, producing a light therefrom.

Having thus described my invention, what I claim as new, and desire to secure by Letters Patent, is—

1. In a dynamo, the combination of a frame, an armature rigidly secured in the frame, a cylinder over the armature rotatably mounted on the non-rotatable axle of the armature, magnets secured in the cylinder so that the positive poles thereof are adjacent and the negative poles are adjacent, cheek-pieces uniting the positive poles and cheek-pieces uniting the negative poles, a commutator-ring and collector-rings on the armature electrically connected with the wound wire of the armature, and brushes rotating with the cylinder secured to such cylinder in electrical contact with the commutator and collector rings; substantially as described.

2. In a dynamo, the combination of a frame, an armature rigidly secured in the frame, such armature comprising soft-iron bars, radial arms connecting oppositely-placed bars and wound wire on the connecting-arms, such wound wire being overwound from one soft-iron bar to the oppositely-placed soft-iron bar, a cylinder rotatably mounted in the frame over the armature, magnets in the cylinder arranged so that positive poles are adjacent and negative poles are adjacent, cheek-pieces uniting the positive poles and cheek-pieces uniting the negative poles, a commutator-ring on the end of the armature and collector rings, and brushes on the revolving cylinder; substantially as described.

3. In a dynamo, the combination of a frame, an armature non-rotatably secured in the frame, such armature comprising soft-iron bars, radial arms connecting oppositely-placed soft-iron bars and wound wire on the radial arms, a cylinder rotatably mounted in the frame over the armature, magnets in the cylinder arranged so that positive poles are adjacent and negative poles are adjacent; cheek-pieces connecting adjacent poles of the magnets, a commutator-ring on the end of the armature, collector-rings on the end of the armature, brushes on the inner face of one of the ends of the cylinder, one of such brushes in contact with the commutator-ring and one of the collector-rings and the other of such brushes in contact with the commutator-ring and the other of the collector-rings, substantially as described.

4. In a dynamo, the combination of a frame, an armature non-rotatably placed in the frame, such armature comprising soft-iron bars with radial arms connecting oppositely-placed bars and overwound wire from one of the soft-iron bars to the oppositely-placed one on the connecting-arm, collector-rings on the end of the armature and a commutator-ring, a cylinder rotatably mounted in the frame over the armature, permanent magnets in the cylinder arranged so that positive poles are adjacent and negative poles are also adjacent, cheek-pieces connecting adjacent poles, positive to positive and negative to negative, ends to the cylinders, brushes on the inner surface of one of the cylinder ends adjacent to the commutator and collector rings, one of such brushes in electrical contact with the commutator-ring and with one of the collector-rings and the other of such brushes in electrical contact with the commutator-ring and the other collector-ring and wires electrically connected to the collector-rings and to the circuit on which the current discharged from the dynamo is used; substantially as described.

EDWARD WILSON FARNHAM.

In presence of—
ELEONORA FERUSNER,
CHARLES TURNER BROWN.